US008651987B2

(12) United States Patent
Chiel

(10) Patent No.: US 8,651,987 B2
(45) Date of Patent: Feb. 18, 2014

(54) ORIENTATION SYSTEM AND METHOD

(75) Inventor: David Chiel, Migdal Haemek (IL)

(73) Assignee: Dotan Ltd., Migdal Haemek (IL)

( * ) Notice: Subject to any disclaimer, the term of this patent is extended or adjusted under 35 U.S.C. 154(b) by 0 days.

(21) Appl. No.: 13/493,108

(22) Filed: Jun. 11, 2012

(65) Prior Publication Data

US 2012/0316017 A1 Dec. 13, 2012

Related U.S. Application Data

(63) Continuation of application No. PCT/IL2010/001055, filed on Dec. 14, 2010.

(30) Foreign Application Priority Data

Dec. 15, 2009 (IL) .......................................... 202732

(51) Int. Cl.
*F16H 7/00* (2006.01)
*H01Q 3/00* (2006.01)

(52) U.S. Cl.
USPC ............. 474/66; 474/114; 474/148; 343/757; 343/882

(58) Field of Classification Search
USPC ........ 474/64, 65, 66, 101, 114, 148; 343/757, 343/765, 766, 878, 880, 882; 248/125.2, 248/332; 74/505, 506
See application file for complete search history.

(56) References Cited

U.S. PATENT DOCUMENTS

| | | | | |
|---|---|---|---|---|
| 4,396,919 A | * | 8/1983 | Speicher | 343/765 |
| 4,491,388 A | | 1/1985 | Wood | |
| 5,519,409 A | * | 5/1996 | Uematsu et al. | 343/771 |
| 5,990,843 A | | 11/1999 | Knapp | |
| 6,172,653 B1 | * | 1/2001 | Ohnishi et al. | 343/882 |
| 6,538,612 B1 | * | 3/2003 | King | 343/757 |
| 6,710,749 B2 | * | 3/2004 | King | 343/757 |
| 6,864,846 B2 | * | 3/2005 | King | 343/757 |
| 8,169,377 B2 | * | 5/2012 | Tippit et al. | 343/757 |
| 2003/0214449 A1 | * | 11/2003 | King | 343/757 |
| 2004/0160375 A1 | * | 8/2004 | King | 343/757 |
| 2005/0280593 A1 | * | 12/2005 | Cha et al. | 343/757 |
| 2007/0019330 A1 | | 1/2007 | Wolfersberger | |
| 2007/0052607 A1 | | 3/2007 | Dwornik et al. | |
| 2007/0103366 A1 | * | 5/2007 | Park | 342/359 |
| 2010/0253586 A1 | * | 10/2010 | Tippit et al. | 343/757 |

* cited by examiner

*Primary Examiner* — William E Dondero
(74) *Attorney, Agent, or Firm* — Holtz, Holtz, Goodman & Chick, PC

(57) ABSTRACT

A system and a method for orientation of a ring by rotation, including a cable engaging the ring which rotates about a ring axis, a motor assembly providing a first rotation reduction, and a stretcher for stretching the cable. The system has at least one proximal pulley and at least one distal pulley rotating about a pulley axis each pulley having grooves configured for receiving the cable therein. The ring is rotated by the motor assembly and the pulley assembly is configured to provide a second reduction of rotation to the ring relative to motor rotation, whereby the ring is driven via at least a double reduction of rotation relative to rotation of the motor, and the cable, the plurality of pulleys, and the ring provide a one-way mechanism.

18 Claims, 7 Drawing Sheets

ORIENTATION SYSTEM AND METHOD

The present application claims benefit of International Application No. PCT/IL2010/001055 filed on 14 Dec. 2010, the priority date of which is claimed herein, and the entire contents of which is incorporated herein by reference.

TECHNICAL FIELD

The present invention relates to an orientation system and method, and in particular to the orientation and positioning of, for example, large size and heavy weight equipment, and of equipment, apparatus and instruments, in precise angular orientation and stable position holding against externally applied forces and eccentrically disposed loads.

BACKGROUND ART

Cable and pulley mechanisms are known per se for centuries. However, attempts to use such mechanisms for precise orientation of large objects have met with difficulties. For example, U.S. Pat. No. 5,990,843 to Roland H. Knapp recites a highly-stiffened, dual-axle antenna tracking pedestal for a satellite tracking station. In another example and for the same purpose. U.S. Pat. No. 4,491,388 to Douglas E. Wood divulges a support system for a solar concentrator with motors that drive sprocket wheels through a chain. It would be beneficial to provide a solution for precisely orienting large size structures and equipment by use of simple and low cost means.

US Patent Application Publication No. 2007/0019330 A1 by Charles Wolfersberger, discloses a motor driven pulley cable tangentially engages a mounting plate for directional orientation of a load such as magnetic elements. US Patent Application Publication No. 2007/0052607 A1 to Glen A. Dwornik et al., divulges a drive unit that propels a driving pulley to transfer motion to a drum via a flexible wire, to rotate an antenna assembly.

Technical Problem

The problem consists of the difficulty to precisely orient large rings supporting equipment structures in precise angular orientation, to maintain the orientation and remain in stable holding position against external forces applied on the equipment, such as winds or eccentric loads for example. Furthermore, it is also difficult to eliminate backlash in particular when attempting to use non-expensive components.

Solution to Problem

The solution for precisely orienting a large dimension ring is provided by use of a combination of a cable and pulleys assembly using large rotation reduction drives in association with the friction of the stretched cable.

Advantageous Effects of Invention

The disclosed solution permits to use low-cost commercial components to achieve high orientation precision and stable position holding by biasing a cable for preloading components of a mechanism and to form a one-way mechanism stable even against high external loads applied thereto.

SUMMARY

It is an object of the present invention to provide a system and a method for operating a cable and a pulley mechanism, for orientation of a ring configured for rotation. The system includes a cable coupled to engage the ring, which is configured to rotate about a ring axis, a motor assembly including a motor coupled to a gearbox, which is rotated by the motor to provide a first rotation reduction, and a stretcher configured for stretching the cable.

The system comprises a pulley assembly having a plurality of pulleys where each one pulley out of the plurality of pulleys is configured to rotate about a pulley axis. The pulley assembly includes an at least one proximal pulley disposed closer to the ring than an at least one distal pulley, where each pulley has a plurality of grooves configured for receiving the cable therein. The system further comprises a driving means disposed adjacent the ring, with the driving means being configured to support the pulley assembly, the motor assembly, and the stretcher in pivotal coupling about a hinge.

In addition, the system comprises the cable being engaged with the ring and with the at least one proximal and distal pulleys by being wound from a first groove in the proximal pulley to a first groove in the distal pulley and in repeated succession, to a next groove in the proximal pulley to a next groove in the distal pulley, until a last groove in the distal pulley, from where winding returns to the ring. The system also comprises the stretcher which is fixedly coupled to the driving means and is configured for pivoting the driving means distally away from the ring to stretch the cable and to bias the ring and the pulley assembly in preload.

Next, the ring is being rotated by the motor assembly, which is coupled to rotate the at least one distal pulley and provides a first reduction of rotation to the pulley assembly, which is configured and sized to provide a second reduction of rotation to the ring relative to motor rotation. Thereby, the ring is driven via at least a double reduction of rotation relative to rotation of the motor, and the cable engages the ring and the plurality of pulleys by friction.

It is a further object of the present invention to provide a method for operating a cable and a pulley mechanism for disposing a ring in a selected orientation. The method comprises providing a cable for engaging the ring and disposing the ring for rotation about a ring axis, providing a motor assembly including a motor coupled to and rotating a gearbox for providing a first rotation reduction drive, and providing a stretcher configured for stretching the cable.

The method is characterized by comprising the following steps. First, providing a pulley assembly with a plurality of pulleys, disposing each one pulley out of the plurality of pulleys for rotation about a pulley axis, including an at least one proximal pulley and at least one distal pulley in the pulley assembly, disposing the at least one proximal pulley closer to the ring than the at least one distal pulley, and providing each pulley with a plurality of grooves for receiving the cable therein.

Second, disposing a driving means adjacent to the ring for supporting the pulley assembly, the motor assembly, and the stretcher, in pivotal coupling about a hinge, and then engaging the cable with the ring and with the at least one proximal and distal pulleys by friction, winding the cable from a first groove in the proximal pulley to a first groove in the distal pulley and thereafter in repeated succession to a next groove in the proximal pulley to a next groove in the distal pulley, until a last groove in the distal pulley, and returning winding from the last groove to the ring.

Third, coupling the stretcher fixedly to the driving means for pivoting the driving means distally away from the ring, for stretching the cable and for biasing the ring and the pulley assembly in preload, and operating the motor assembly for rotating the at least one distal pulley for providing a first rotation reduction drive to the pulley assembly, and appropriately sizing the pulley assembly for providing a second rotation reduction drive for rotating the ring, thereby achieving at least a double reduction drive relative to rotation of the motor.

BRIEF DESCRIPTION OF DRAWINGS

Exemplary embodiments are illustrated in referenced figures. It is intended that the embodiments and figures disclosed herein are to be considered illustrative, rather than restrictive. The invention, however, both as to organization and method of operation, together with objects features, and advantages thereof, may best be understood by reference to the following detailed description when read with the accompanying figures, in which.

DESCRIPTION OF EMBODIMENTS

The embodiments described hereinbelow are described with reference to an exemplary embodiment selected as a system adapted to a tracking station. However, a method for operating a cable and a pulley mechanism for disposing a ring in a selected orientation may be used for other equipment requiring for example a large-size rotating ring requiring an open aperture having an interior diameter of large size.

Figure 1:
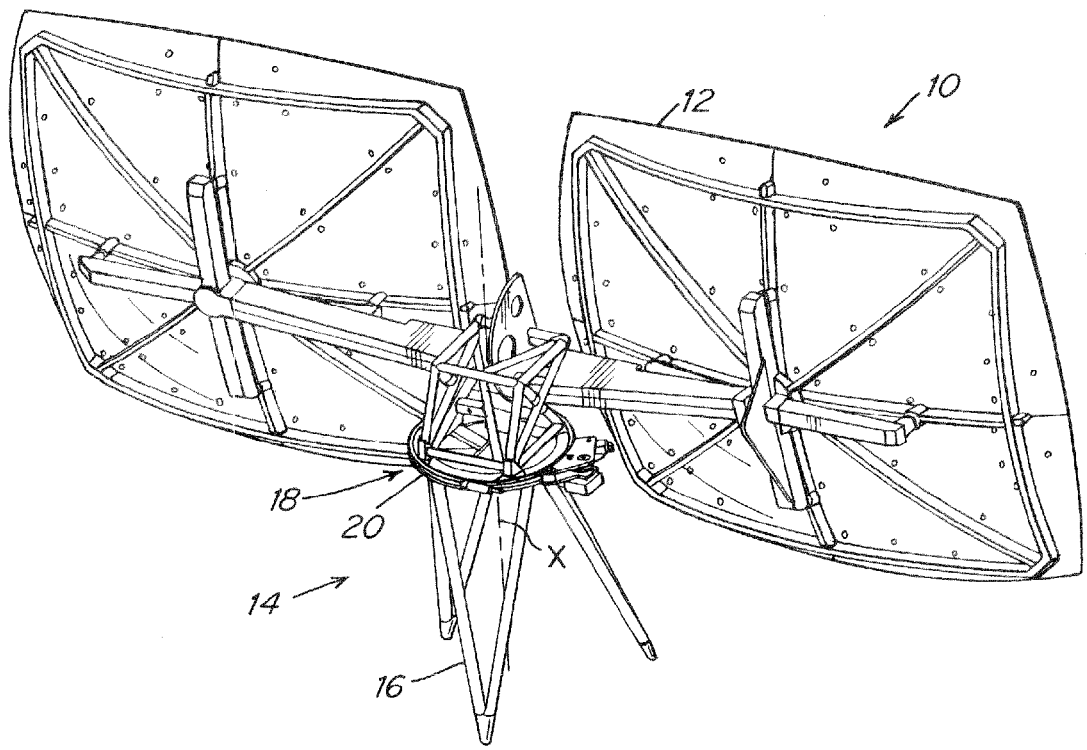
FIG. 1 shows a perspective right view of a tracking station that includes a base in accordance with the present invention.

For example thus, FIG. 1 shows a tracking station 10, which has a tracking head 12 and a base 14. The tracking head 12 may be a solar concentrator for impinging rays of the sun to a particular point such as a photovoltaic cell, or an antenna such as a satellite dish for receiving and/or transmitting signals. The base 14 has a pedestal 16 and an adjuster 18 that is located on top of the pedestal 16. The pedestal 16 extends upright along an axis X in relation to a ground surface upon which it is disposed and the adjuster 18 is adapted to support the tracking head 12 at any one of a plurality of angular orientations.

It is noted that directional terms appearing throughout the specification and claims, e.g. "forward", "rear", "up", "down" etc, and derivatives thereof, are used for illustrative purposes only, and are not intended to limit the scope of the appended claims. In addition it is noted that the directional terms "down", "below" and "lower", and derivatives thereof, define identical directions, all oriented toward the ground. Evidently, "up", "down" and no forth, refer to opposite directions, pointing toward the sky.

Figure 2:
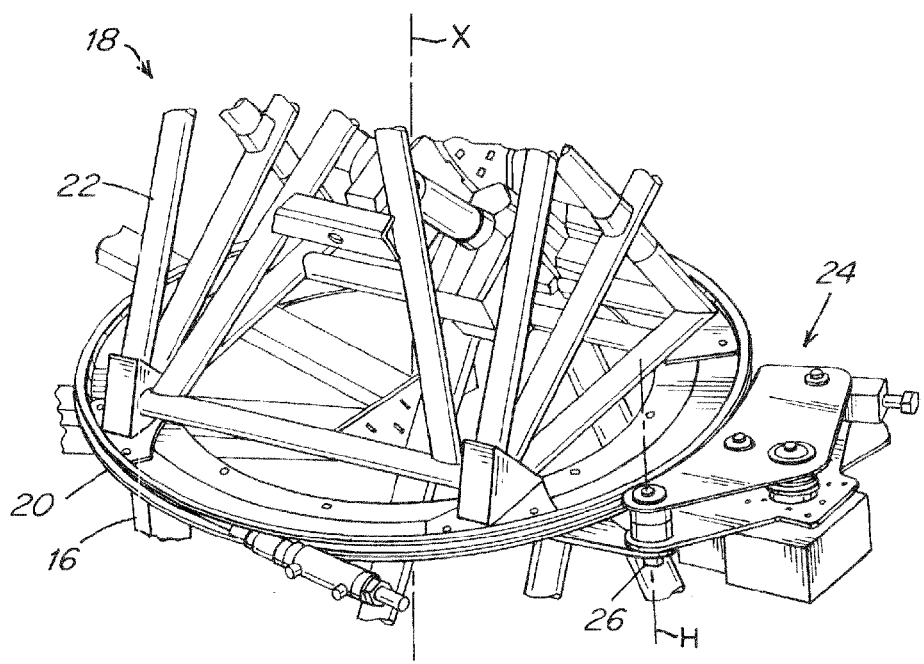
FIG. 2 shows an enlarged view of a portion of the base.
Figure 3:
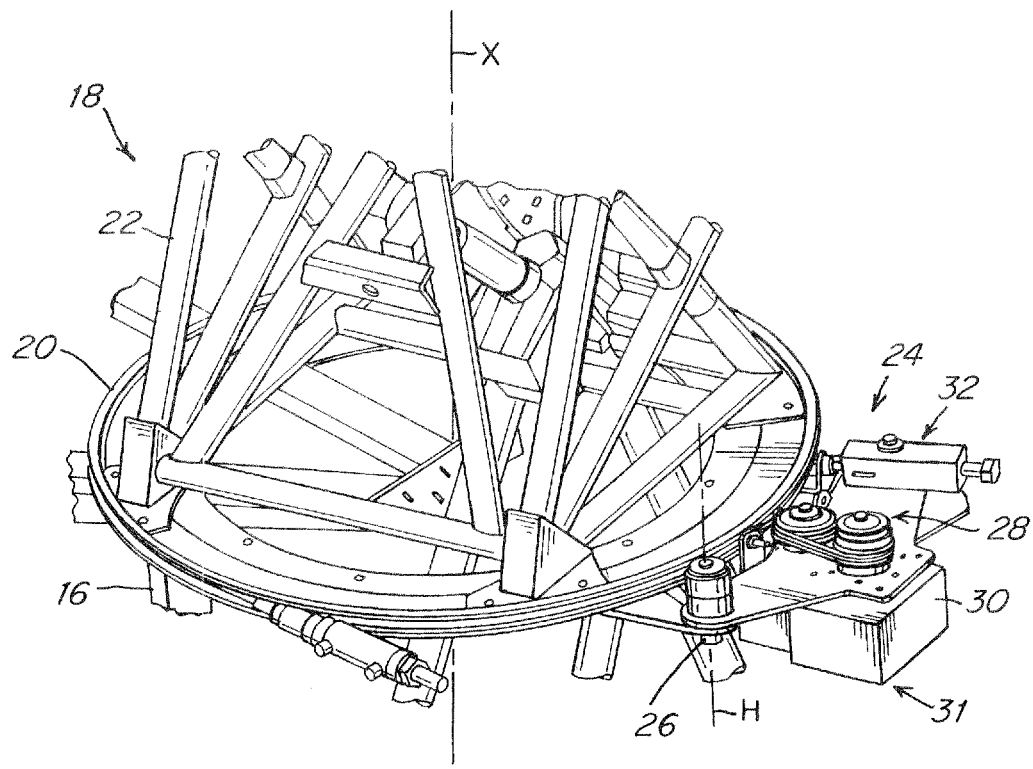
FIG. 3 shows the portion of the base as seen in FIG. 2 with a portion of a driving means removed for clarity.

Attention is now drawn to FIGS. 2 and 3, where the adjuster 18 is shown to have a ring 20, shown for example as a horizontal ring 20, a supporting construction such as an optional truss 22, or structure, and a driving means 24, or horizontal driving means 24. The ring 20 may be configured and built as a bearing such as a commercially available ball bearing for example. The truss 22 is disposed on the horizontal ring 20 and the horizontal driving means 24 is adapted to rotate the horizontal ring 20 about a ring axis X, which may also be the axis X of the pedestal 16, in two opposite directions between a plurality of angular orientations, which in this example, are horizontal orientations ranging to above 360° in each direction. The driving means 24, here example horizontal driving means 24, is connected to the pedestal 16 by a hinge 26 and has a pulley assembly 28, a motor 30 and a stretcher 32. The hinge 26 pivots about a hinge axis H.

Figure 4:
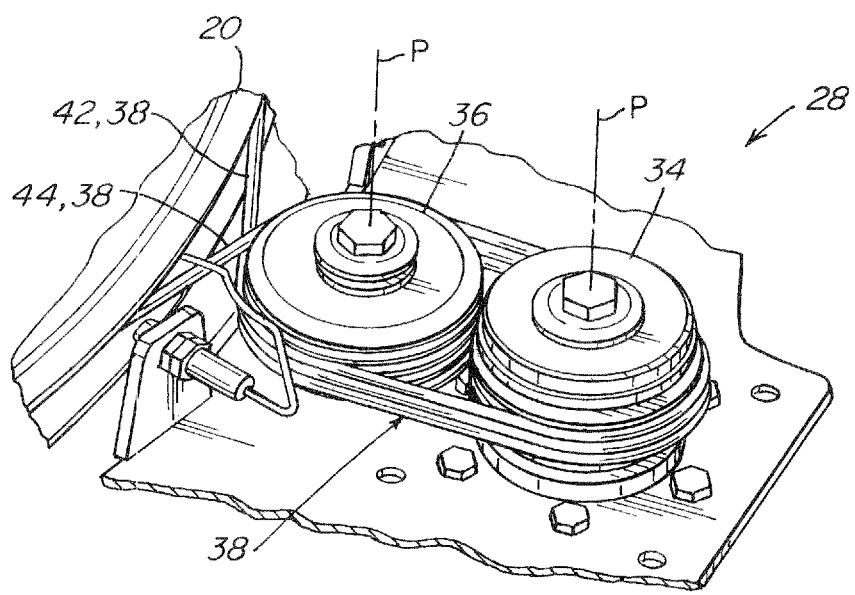
FIG. 4 shows two pulleys of the driving means engaged with a cable of the orientation system.
Figure 5:
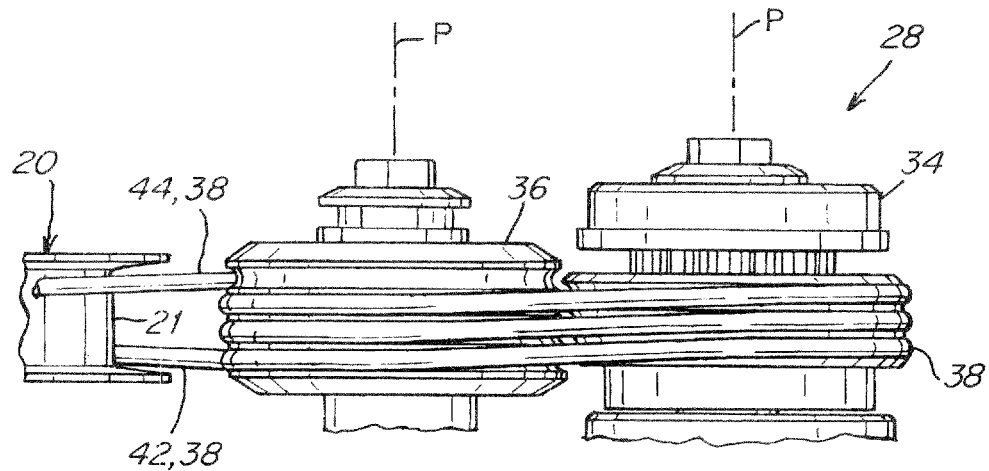
FIG. 5 shows a side view of the pulleys and cable seen in FIG. 4.

In FIGS. 4 and 5, the pulley assembly 28 has at least a pair of adjacent pulleys 34 and 36, namely at least one proximal pulley 34 and at least one distal pulley 36, each having an axis of rotation indicated as pulley axis P. Proximal and distal refer to the disposition relative to the ring 20. The pulley axes P are generally parallel to the ring axis X and each pulley 34 and 36 is adapted to freely rotate about its respective pulley axis P. A first one of the pulleys 34 is defined as a distal pulley which is disposed distal of the ring 20, here the horizontal ring 20, and a second one of the pulleys 36 is defined as a proximal pulley which is proximal to the horizontal ring 20. The distal pulley 34 is operatively coupled to the motor 30, seen in FIGS. 2 and 3, and is adapted to be rotated by the motor 30 about the pulley axis P, which is parallel to the ring axis X. A cable 38 engages the two pulleys 34 and 36 and the horizontal ring 20. The cable 38 that extends to be wound around the horizontal ring 20 stretches out to wind a few times, optionally three times, around the pulleys 34 and 36, and then stretches back to surround the ring 20.

The winding of the cable 38 around the pulleys 34 and 36 is disposed such that the cable 38 stretching out from the horizontal ring 20, winds around a portion of the proximal pulley 36 and then stretches out to wind around a portion of the distal pulley 34 to complete a first coil of the cable 38 around the pulleys 34 and 36. Next, the cable 38 stretches back to wind around a portion of the proximal pulley 36 to start a second coil loop around the pulleys 34 and 36. After optionally three such coil loops around the pulleys 34 and 36, the cable 38 returns back to merge with the portion of the cable 38 that stretches around the horizontal ring 20 and forms a single continuous loop of cable coil around the horizontal ring 20. If desired, the cable 38 may wind around the ring 20 more than once to provide orientation of more than and multiples of 360°. Many windings around the ring 20 will result in more force since force increases exponentially with the angle covering the ring 20 and/or the pulleys 34 and 36.

Figure 6:
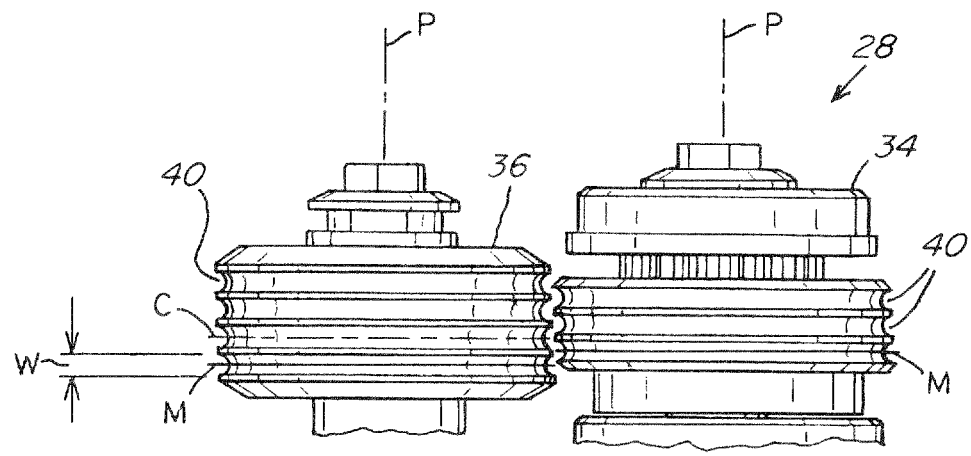
FIG. 6 shows the pulleys as seen in FIG. 5 without the cable.
Figure 7:
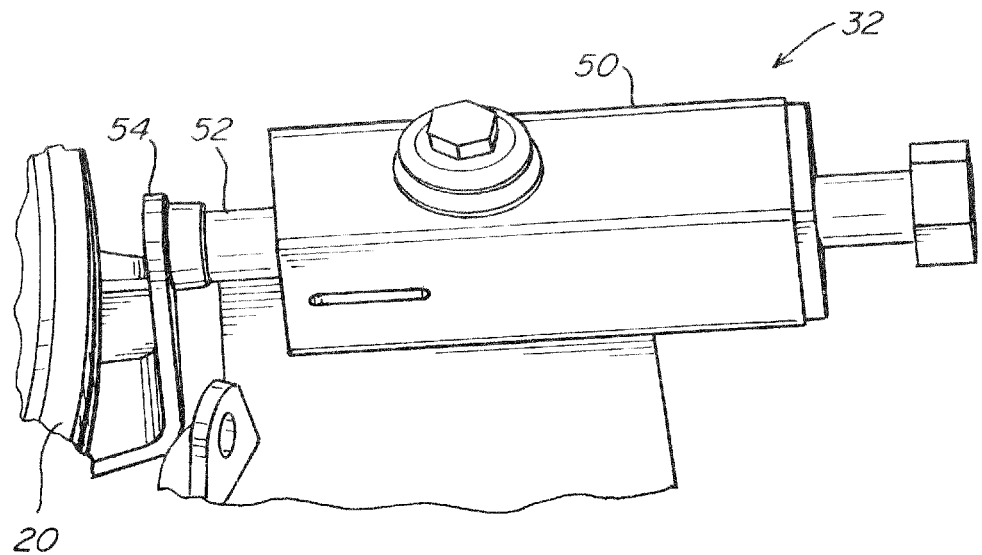
FIG. 7 shows a stretcher of the driving means.
Figure 8:
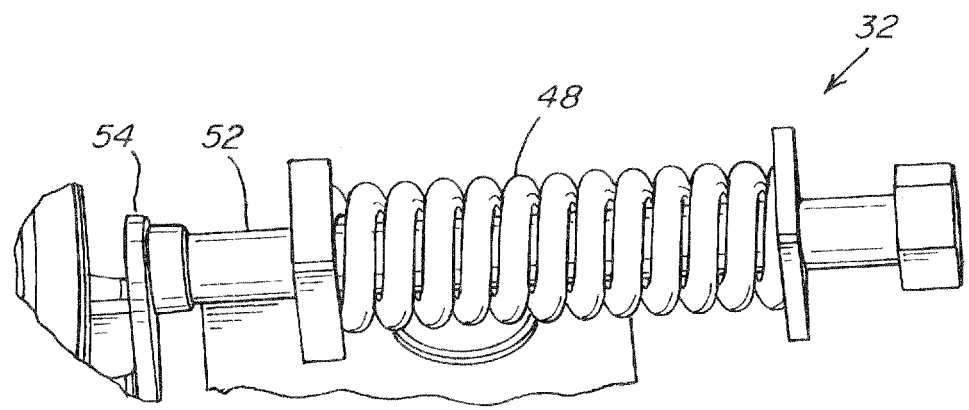
FIG. 8 shows the stretcher as seen in FIG. 7 with a cover thereof removed.

In FIG. 6, each pulley 34 and 36 has a series of grooves 40 that are formed on a peripheral face thereof. Each groove 40 fully surrounds the periphery of a given pulley 34 and 36 along an imaginary circle C and has a groove width W extending along the direction of the pulley axis P for engaging the cable 38 therein.

An imaginary median plane M is defined as including the imaginary circle C of each groove 40 thereby dividing each groove 40 in two portions. In FIG. 6 two such planes M are shown passing through the lower groove 40 of each pulley 34 and 36. Optionally, the grooves 40 formed on the distal pulley 34 are axially displaced in relation to the grooves 40 formed on the proximal pulley 36 and optionally that displacement is made along an axial distance equal to a portion of or to half of the groove width W. The grooves 40 of each given pulley 34 and 36 may be referred to as first second, third groove and so on, according to their respective order along the pulley axes P, say from bottom to top of the pulley. All the grooves 40 of the pulley assembly 28 are mutually parallel and are disposed parallel to the ring 20, thereby being configured to accept an endless cable 38.

In other words, the at least one proximal pulley 34 and the at least one distal pulley 36 have, respectively, a first set and a second set of parallel grooves 40, with the grooves having a same groove distribution and a same groove width (W). Furthermore, one of the first set and the second set of parallel grooves is disposed parallel relative to the other set of grooves by displacement in pulley axis P direction along a distance equal to a portion of the groove width W, or to half the groove width W, whereby the cable 38, which is stretched between a groove in the at least one proximal pulley 36 and a groove in the at least one distal pulley 34, slants in oblique disposition. Thereby the cable 38 which is stretched between a groove in the at least one proximal pulley 36 and a groove in the at least one distal pulley 34, slants in oblique disposition.

The cable 38 may be selected as a closed loop cable encircling the ring 20 and the pulley assembly 28 to provide any desired angular orientation of the ring 20, and in the present example, of the tracking head 12, in either direction, ranging from an angle of 0° to n×360°, where n is an integer. If desired, the cable 38 may be cut to length, wound around the pulleys 34 and 36, and have a first and a second cable end coupled to the ring 20 to provide angular orientation of the tracking head 12 in either direction, ranging from an angle of 0° to more than 360°. The first and the second cable ends are not shown in the Figs, where only a closed loop cable 38 is shown.

The motor 30 may be selected as a step motor assembly 31 including a gearbox 60 providing a first rotation drive reduction of 1:2000 for example. In turn, the relative size of the ring 20 relative to the pulleys of the pulley assembly 28 may provide a second rotation drive reduction of 1:10 for example, whereby the total reduction achieved may be 1:20000. The second rotation drive reduction, provided by the proportion of the diameters of the ring 20 and of the pulleys 34 and 36, may achieve a ration of 10:1, but other proportions may also be selected. Thereby, thanks to the reduction drives, a low power motor 30 will be able to rotate a heavy load, such as a heavy tracking head 12 for example, to very precise angular orientations. In addition, external forces such as wind forces on a dish antenna for example, will not affect the orientation of the tracking head 12, since the assembly including the ring 20, the cable 38, the pulley assembly 28, and the motor 30, and the stretcher 32, are configured as a practical a one-way mechanism.

This means that the first and the second rotation reduction drive in association with frictional engagement of the cable 38 with the ring 20 and with the assembly of pulleys 28, are configured to form a one-way mechanism allowing the motor 30 to drive the ring 20, but preventing the ring 20 to be driven by external forces applied to the ring. Furthermore, the stretch of the cable, the bias imparted by the cable, and the winding of the cable around the pulley assembly 28 and the ring 20, may prevent backlash and ensure precise angular orientation and stable directional position holding, even when large forces, such as wind forces or eccentric loads are applied to the ring 20, of for example to the tracking head 12.

Figure 12:
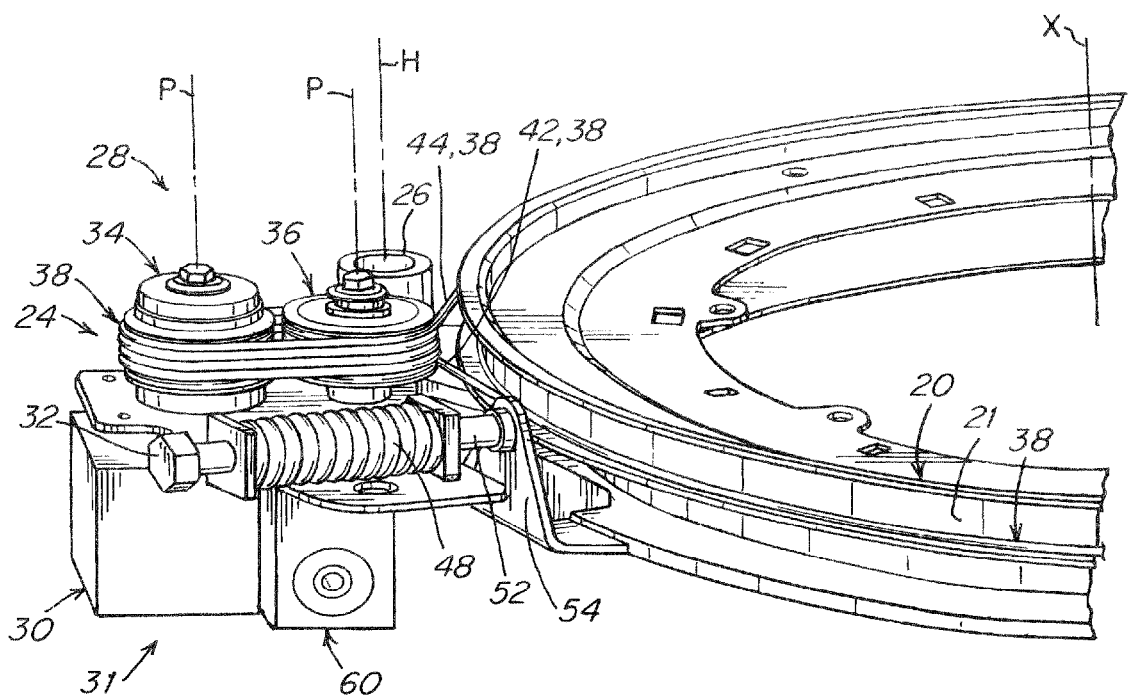
FIG. 12 depicts the driving means in more details.

In FIG. 12, the cable 38 is shown wound around the horizontal ring 20 along the ring periphery 21, or peripheral groove 21, to extend thereout intermediate the ring 20 and the proximal pulley 36 in two directions. In one direction, a first portion 42 of the cable 38 extends along a lower portion of the ring periphery 21 or peripheral groove 21, and in the other opposite direction a second portion 44 of the cable 38 extends along an upper portion of the peripheral groove 21 of the ring 20.

The first portion 42 of the cable 38 stretches out to wind along a portion of the lowest first groove 40 of the proximal pulley 36 and then stretches on to wind along a portion of the lowest first groove 40 of the distal pulley 34. From there the cable 38 stretches back to complete a first wind of the pulleys 34, 36 and then starts the second wind of the pulleys 34 and 36 by winding along a portion of the second groove 40 of the proximal pulley 36 and so on. After completing three such windings of the pulleys 34 and 36 for example, the cable 38 stretches back to wind along an upper portion of the ring periphery 21, shown in FIG. 6 as the second portion 44 of the cable 38.

As described hereinabove, the grooves 40 disposed on the distal pulley 34 are axially out of match relative to the grooves 40 disposed on the proximal pulley 36, or vice versa. The cable 38 which passes from one groove 40 of the proximal pulley 36 to a matching groove 40 disposed on the distal pulley 34 slants in oblique and is not perpendicular to the axes P. This feature allows keeping the pulley axes P parallel to the ring axis X and provides additional frictional engagement of the cable 38 with the grooves 40.

The horizontal driving means 24 is pivotally coupled to the pedestal 16 of the tracking station 10 at the hinge 26, which pivots about the hinge axis H. To mutually bias the mating components operative to orient the ring 20 of the tracking station which components are the cable 38 on the one hand and the horizontal ring 20 and the pulley assembly 28 on the other hand, the horizontal driving means 24 is initially biased by the stretcher 32, to pivot about the hinge 26 in a distal direction away from the ring 20. This initial bias of the horizontal driving means 24 away from the horizontal ring 20 introduces tension into the cable 38 which in turn increases the bearing load of the cable 38 upon the surfaces of the horizontal ring 20 and of the pulleys 34 and 36 around which it is wound.

Actually, the tension in stretch of the cable 38 preloads the orientation mechanism and not only reduces but practically eliminates backlash in the orientation of the ring 20, and thus of the tracking station 10. Since the ring 20 is preferably selected as a bearing, such as a ball bearing for example, the stretched cable 38 may eliminate existing clearances, thereby permitting to avoid the use of high-precision bearings. The ring may be configured as a ball bearing, which is biased by the cable, which is stretched to prevent backlash in the system. Furthermore, the ball bearing may be biased and preloaded to provide precise angular orientation and stable position holding. Moreover, when the ring is configured as a low-cost ball bearing having, substantially wide clearances, biasing and preloading thereof eliminate therein the negative effects of the large clearances. Thereby costs are reduced by allowing construction with lower precision components.

It is noted that the ring axis X, the hinge axis H, and the axes P of the plurality of pulleys 34 and 36 are disposed in parallel to each other, which is another feature permitting to reduce construction costs.

To ensure precise orientation of the ring 20, the cable 38 has to remain stretched. Therefore, the stretcher 32 is preferably mounted on the driving means 24 to produce a constant biasing force that urges the pulley assembly 28 to pivot about the hinge 26 distally, thus away from the ring 20. The stretcher 32 includes a biasing means 48, which is optionally configured as a helicoidal spring that is disposed within a housing 50. A piston 52 is operatively coupled to the biasing means 48 and projects out of the housing 50 to bear against a support 54 that is fixedly coupled to the pedestal 16, which is the static portion supporting the ring 20 of the of the tracking station 10.

When the ring 20 is configured as a ball bearing, the drive means 24 may be coupled to the rotating race. In such case, the support 54 for the stretcher 32 will rotate together with the driving means 24.

FIG. 12 shows an embodiment and better illustrates the components of the drive means 24 as well as a portion of the ring 20 and of the cable 38. A top cover of the drive means 24 has been removed to better expose the elements of the pulley assembly 28. Furthermore, the housing 50 of the stretcher 32 has been taken off to show the biasing means 48.

In FIG. 12, the drive means 24 are shown to support the motor assembly 31, the stretcher 32, the pulley assembly 28, and the hinge 26. The motor assembly 31 includes the motor 30 and the gearbox 60 operative to drive a pulley, say the distal pulley 34. The stretcher 32 uses the biasing means 48 to operate the piston 52 against a static support 54 to pivot the drive means 24 about the hinge axis H of the hinge 26. Thereby, the pulley assembly 28 is retracted, thus pulled back and away from the ring 20, thereby stretching the cable 38.

Still in FIG. 12, a first portion 42 of the cable 38 is shown to extend along a lower portion of the ring periphery 21 and to engage a bottom groove of the proximal pulley 36. From there, the cable 38 winds to the distal pulley 34 and back to the proximal pulley, to a groove just above the bottom groove, and so on, as described hereinabove, to finally reach the uppermost groove 40 of the proximal pulley 36 and disengage, as shown by second portion 44 of the cable 38, to loop around the ring 20 in opposite direction of the first cable portion 42. The periphery 21, or ring groove 21 of the ring 20 is wide enough to accept both the first portion 42 and the second portion 44 of the cable 38, respectively incoming and outgoing from the pulley assembly 28.

As well known with systems and methods for operating a cable 38 and a pulley mechanism, it is the stretching force in the cable 38 and the angle covered by the cable that provide the mechanical advantage of a cable and pulley mechanism.

Figure 9:
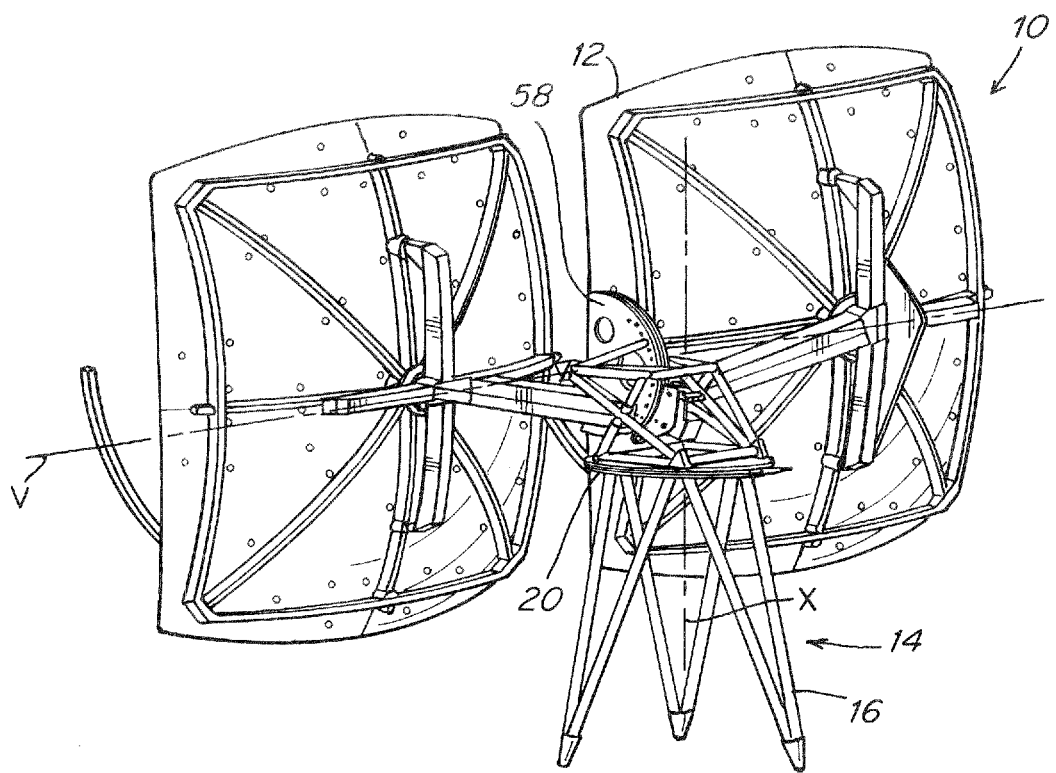
FIG. 9 shows a perspective left view of the tracking station with the base in accordance with the present invention.
Figure 10:
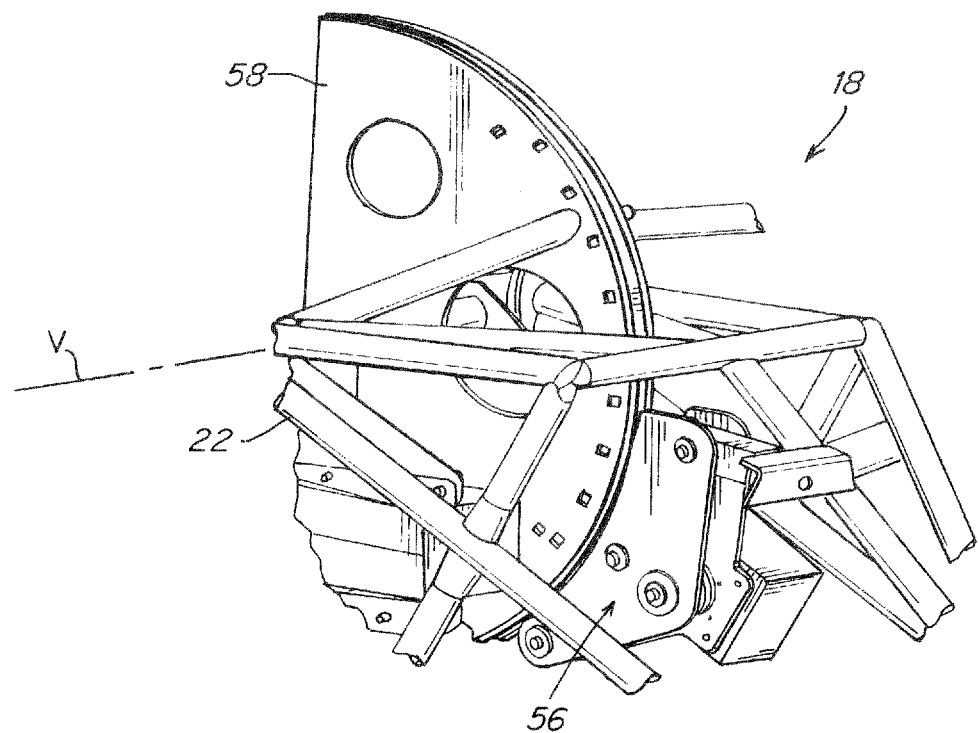
FIG. 10 shows an enlarged view of a portion of the base.
Figure 11:
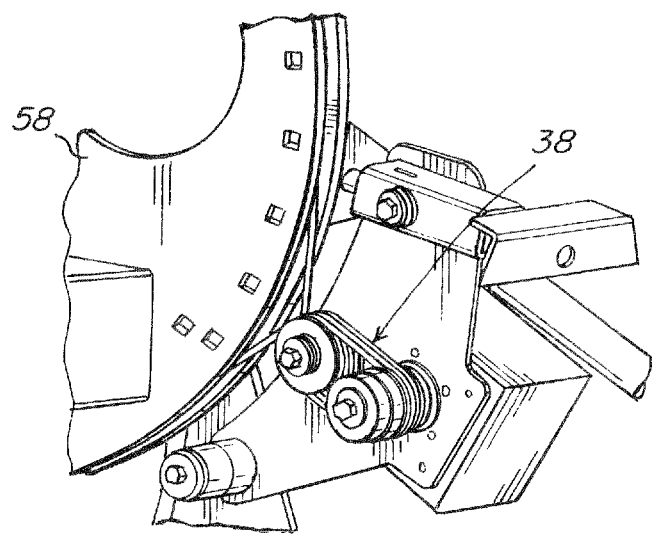
FIG. 11 shows the portion of the base as seen in FIG. 10 with a portion of a driving means thereof removed for clarity.

FIGS. 9 to 11 illustrate an embodiment showing that use of the orientation system is not restricted to the horizontal disposition of the ring 20 hut may be taken advantage of in any desired direction. Such a need may arise for example with medical equipment, such as with Computed Tomography or CT scan apparatus for example, where the opening of the ring through which the patient is introduced is of large diameter. The rotating ring of CT apparatus often carries loads, possibly eccentrically disposed loads that bias the orientation of the ring, which nevertheless has to be disposed in precise orientation. As an example only, the ring 20 is shown in vertical disposition in the description hereinbelow with reference to the embodiment for the tracking station 10.

Still with reference to FIGS. 9 to 11, the tracking station 10 has in addition to the horizontal driving means 24 also an optional vertical driving means 56 that is supported by the truss 22 of the adjuster 18 and thereby is adapted to rotate together with the truss 22 about the horizontal axis V, which is perpendicular to the vertical ring axis X. The truss 22 is operatively coupled to support both the vertical driving means 56 and the horizontal driving means 24, each coupled to their respective vertical ring 58 and horizontal ring 20. The vertical driving means 56 is generally similar to the horizontal driving means 24 and imparts to the tracking station 10 the ability to dispose the tracking head 12 in a plurality of vertical angular orientation. The vertical driving means 56 is coupled by a cable 38 to the vertical ring 58 that may not necessarily cover a complete circle but may extend along only a portion of a circle, to form an arc of a circle covering a sector of a circular contour. The vertical ring 58 is adapted to be rotated about a horizontal axis V that is generally perpendicular to the vertical ring axis X.

For orientation of the ring 20, a controller, not shown in the Figs., may send signals to any one of the driving means 24 and/or 56 to drive the respective motors into rotation and thereby operate the stretched cable(s) 38, which by friction cause the pulleys to rotate and the rings 20 and 58 to swivel into any desired angular orientation.

It is noted that the tracking station 10, in accordance with some embodiments of the present invention, may exhibit relatively accurate orientation for tracking in azimuth and in elevation, thus precise orientation with relatively simple and inexpensive components such as bearing type rings 20 and 58 of relatively low accuracy that may have quite wide clearances. Use of such low-cost products usually results in inaccurate orientation in azimuth and elevation and eccentric alignment respective to the axes X and V about which they are adapted to rotate. However, with the present embodiments, even rings 20 and 58 configured as say hall-bearing-type rings with large clearances will still provide extremely precise orientation.

As described hereinabove with respect to a horizontal ring 20, the biasing means 48 applies forces that stretch the cables 38, preloads and urges the ring 20 towards a given side of the system 10. Thereby, the stretched cable 38 forces the outer race of the ball-bearing, the bearing balls, and the inner race of the ball-bearing type ring 20, closely together, whereby any clearance in azimuth in the biasing direction is eliminated. Such biasing ensures that at all times during orientation, the ring 20 is forced to one side of the system 10 so that clearances are eliminated and backlash is avoided.

In addition it is noted that as a result of a symmetric or asymmetric load distribution on the ring 20, an additional preload force or an additional preload moment may be applied to the horizontal ring 20 on top of the stretching force of the cable 38, to further assists to reduce and/or eliminate clearances and enhance positional accuracy of the tracking station 10.

INDUSTRIAL APPLICABILITY

The system and method described hereinabove are evidently applicable to the mechanical and machine industry.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

REFERENCE SIGNS LIST

H hinge axis
P pulley axis
W groove width
X ring axis
10 tracking station
12 tracking head
14 base
16 pedestal 18 adjuster
20 ring
21 ring periphery/ring groove
22 truss, structure
24 driving means
26 hinge
28 pulley assembly
30 motor
31 motor assembly
32 stretcher
34 distal pulley
36 proximal pulley
38 cable
40 pulley groove
42 first portion of the cable 38
44 second portion of the cable 38
48 biasing means
50 housing
52 piston
54 support
56 vertical driving means
58 vertical ring
60 gearbox

The invention claimed is:

1. A system for orientation of a ring configured for rotation, the system comprising:
   a cable coupled to engage the ring which is configured to rotate about a ring axis,
   a pulley assembly having a plurality of pulleys where each one pulley out of the plurality of pulleys is configured to rotate about a pulley axis which is parallel to the ring axis, the pulley assembly including an at least one proximal pulley disposed closer to the ring than an at least one distal pulley, where each pulley has a plurality of grooves configured for receiving the cable therein,
   a motor assembly including a motor coupled to a gearbox which is rotated by the motor to provide a first rotation reduction,
   a driving means disposed adjacent to the ring in pivotal coupling about a hinge, and configured to support the pulley assembly, the motor assembly, and a stretcher, the cable being engaged with the ring and with the at least one proximal and distal pulleys by being wound from a first groove in the proximal pulley to a first groove in the distal pulley and in repeated succession, to a next groove in the proximal pulley to a next groove in the distal pulley, until a last groove in the distal pulley, from where winding returns to the ring,
   the stretcher being fixedly coupled to the driving means for pivoting the driving means distally away from the ring to stretch the cable and to bias the ring and the pulley assembly in preload, and
   the ring being rotated by the motor assembly which is coupled to rotate the at least one distal pulley and provides a first reduction of rotation to the pulley assembly which is configured and sized to provide a second reduction of rotation to the ring relative to motor rotation,
   whereby the ring is driven via at least a double reduction of rotation relative to rotation of the motor, and the cable engages the ring and the plurality of pulleys by friction.

2. The system of claim 1, wherein:
   the ring is configured as a ball bearing, and
   the ball bearing is biased by the cable which is stretched to prevent backlash in the system.

3. The system of claim 1, wherein:
   the ring is configured as a ball bearing, and
   the ball bearing is biased and preloaded to provide precise angular orientation and stable position holding.

4. The system of claim 1, wherein:
   the ring is configured as a low-cost ball bearing (60) having substantially wide clearances, and
   the ball bearing is biased and preloaded to eliminate herein effects of clearances.

5. The system of claim 1, wherein:
   the hinge is configured to pivot about a hinge axis, and
   the ring axis, the hinge axis and the axes of the plurality of pulleys are disposed in parallel to each other.

6. The system of claim 1, wherein:
   the at least one proximal pulley and the at least one distal pulley have, respectively, a first set and a second set of parallel grooves, the grooves having a same groove distribution and a same groove width, and
   one of the first set and the second set of parallel grooves is disposed parallel relative to the other set of grooves by displacement in pulley axis direction along a distance equal to a portion of the groove width,
   whereby the cable which is stretched between a groove in the at least one proximal pulley and a groove in the at least one distal pulley, slants in oblique disposition.

7. The system of claim 6, wherein:
   one of the first set and the second set of parallel grooves is disposed parallel relative to the other set of grooves by displacement in pulley axis direction along a distance equal to half of the groove width.

8. The system of claim 1, wherein:
   the cable engaging the ring and the pulley assembly allows orientation of the ring in either direction of rotation to an angle ranging from 0° to n×360°, where n is an integer.

9. The system of claim 1, wherein:
   the first and the second rotation reduction drive in association with frictional engagement of the cable with the ring and with the assembly of pulleys, are configured to form a one-way mechanism allowing the motor to drive the ring but preventing the ring to be driven by external forces applied to the ring.

10. A method for operating a cable and a pulley mechanism for disposing a ring in a selected orientation, the method comprising:
    providing the cable for engaging the ring and disposing the ring for rotation about a ring axis,
    providing a motor assembly including a motor coupled to and rotating a gearbox for providing a first rotation reduction drive, and
    providing a stretcher configured for stretching the cable, the method being characterized by comprising the steps of:
    providing a pulley assembly with a plurality of pulleys, disposing each one pulley out of the plurality of pulleys for rotation about a pulley axis, including an at least one proximal pulley and at least one distal pulley in the pulley assembly, disposing the at least one proximal pulley closer to the ring than the at least one distal pulley and providing each pulley with a plurality of grooves for receiving the cable therein,
    disposing a driving means adjacent to the ring for supporting the pulley assembly, the motor assembly, and the stretcher, in pivotal coupling about a hinge,
    engaging the cable with the ring and with the at least one proximal and distal pulleys by friction, and winding the cable from a first groove in the proximal pulley to a first groove in the distal pulley and thereafter in repeated succession to a next groove in the proximal pulley to a next groove in the distal pulley, until a last groove in the distal pulley, and returning winding from the last groove to the ring, coupling the stretcher fixedly to the driving means for pivoting the driving means distally away from the ring, for stretching the cable and for biasing the ring and the pulley assembly in preload, and operating the motor assembly for rotating the at least one distal pulley for providing a first rotation reduction drive to the pulley assembly, and appropriately sizing the pulley assembly for providing a second rotation reduction drive for rotating the ring, thereby achieving at least a double reduction drive relative to rotation of the motor.

11. The method of claim 10, further comprising the steps of:

selecting the ring as a ball bearing, and biasing the ball bearing by stretching the cable for preventing backlash in the cable and pulley mechanism.

12. The method of claim 10, further comprising the steps of:

selecting the ring as a ball bearing, and biasing and preloading the ball bearing for providing precise angular orientation and stable position holding.

13. The method of claim 10, further comprising the steps of:

selecting the ring as a low-cost ball bearing having substantially wide clearances, and biasing and preloading the ball bearing for eliminating therein effects due to clearances.

14. The method of claim 10, further comprising the steps of:

selecting the hinge for pivoting about a hinge axis, and disposing the ring axis, the hinge axis and the axes of the plurality of pulleys in parallel to each other.

15. The method of claim 10, further comprising the steps of:

providing the at least one proximal pulley and the at least one distal pulley with, respectively, a first set and a second set of parallel grooves, where all grooves have a same groove distribution and a same groove width, and disposing one of the first set and the second set of parallel grooves in parallel relative to the other set of grooves by displacing thereof in pulley axis direction along a distance equal to a portion of the groove width, thereby stretching the cable between a groove in the at least one proximal pulley and a groove in the at least one distal pulley in slant and oblique disposition.

16. The method of claim 15, further comprising the step of:

disposing one of the first set and the second set of parallel grooves in parallel relative to the other set of grooves by displacing thereof in pulley axis direction along a distance equal to half of the groove width.

17. The method of claim 10, further comprising the steps of:

providing the cable engaging the ring and the pulley assembly for allowing orientation of the ring in either direction of rotation to an angle ranging from 0° to n×360°, where n is an integer.

18. The method of claim 10, further comprising the step of:

selecting the first and the second rotation reduction drive, in association with frictional engagement of the cable with the ring and with the assembly of pulleys, for forming a one-way mechanism allowing the motor to drive the ring but preventing the ring to be driven by external forces applied to the ring.

* * * * *